… … …

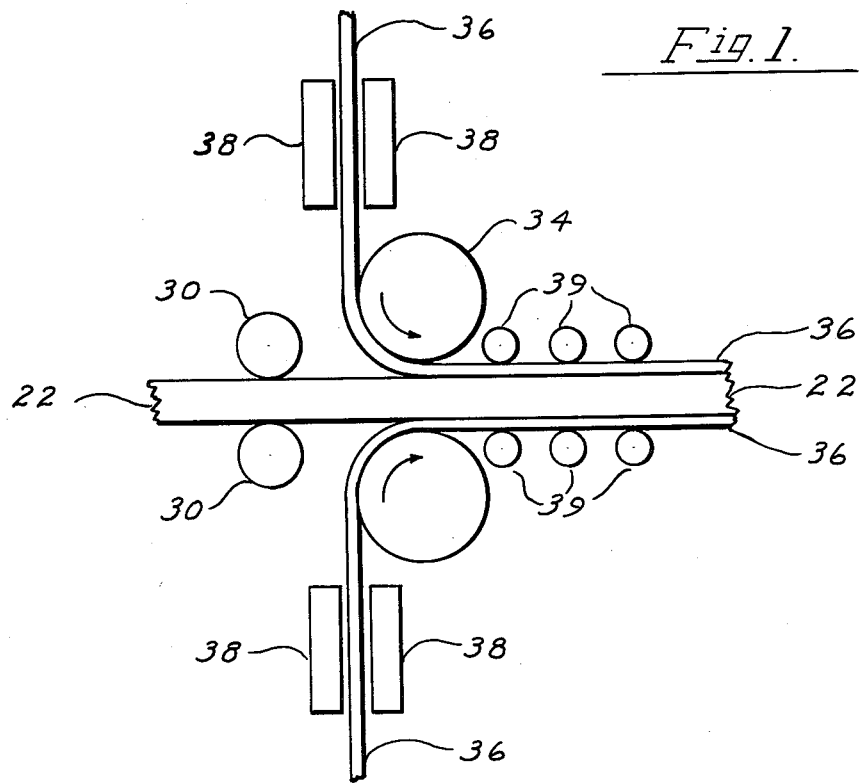

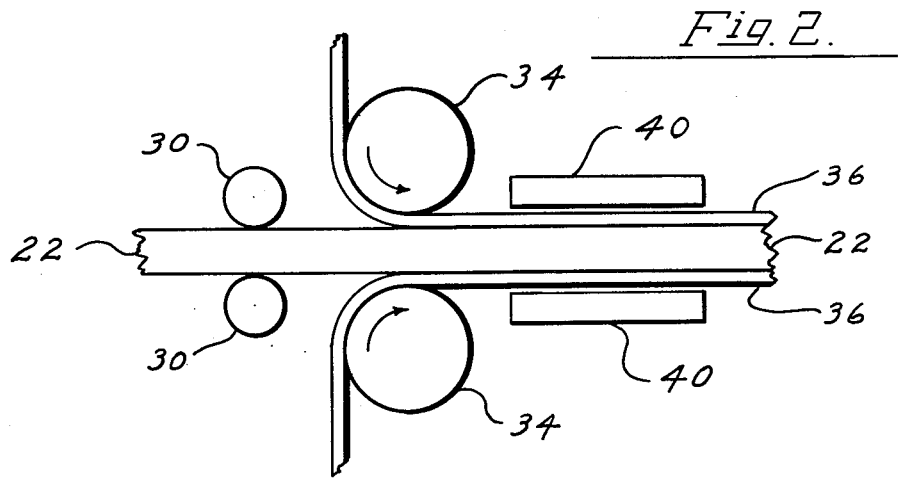
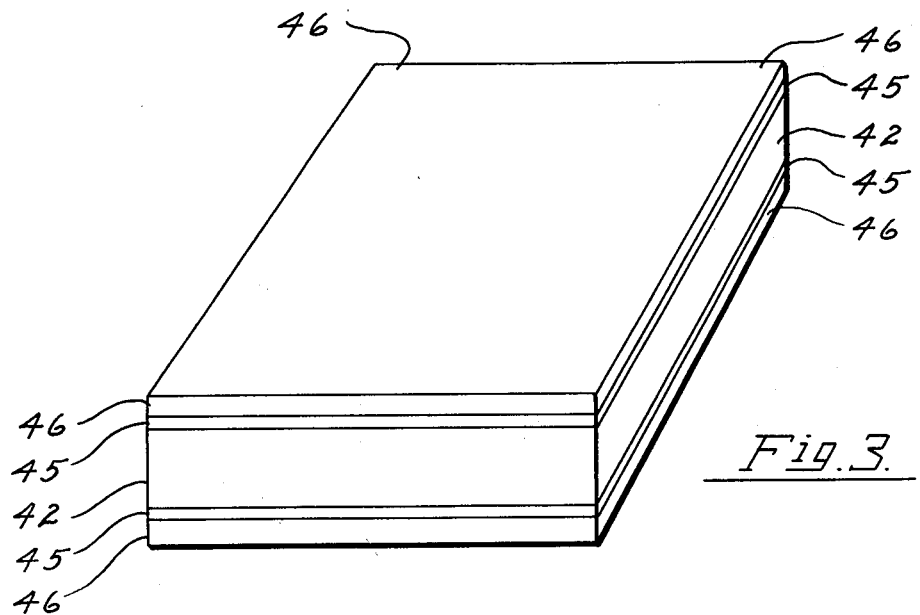

3,062,698
METHOD FOR LAMINATING PAPER AND TEXTILE MATERIALS TO FOAMED THERMOPLASTIC RESIN FORMS
Ardashus A. Aykanian, Indian Orchard, Mass., assignor to Monsanto Chemical Company, St. Louis, Mo., a corporation of Delaware
Filed Oct. 17, 1955, Ser. No. 540,799
4 Claims. (Cl. 156—306)

This invention relates to methods for laminating paper and textile materials to foamed thermoplastic resin forms.

Foamed thermoplastic resins such as foamed polystyrene are low density materials having high strength/weight ratios and excellent insulating properties. In many of the applications of these foamed thermoplastic resins it is either necessary or desirable to laminate sheets of paper or textile materials to one or more surfaces of the foamed theromplastic resin form. The methods heretofore employed in preparing such laminates have been relatively inefficient. In general, an adhesive is applied to one or more of the surfaces of the foamed thermoplastic resin form which is then held in engagement with the covering material until the adhesive sets or cures.

It is an object of this invention to provide improved methods for laminating paper and textile materials to foamed thermoplastic resin forms.

Other objects and advantages of this invention will become apparent from the following detailed description thereof when read in conjunction with the attached drawings in which FIGS. 1 and 2 are side elevational views of apparatuses for carrying out the process of the present invention on a continuous basis, and FIG. 3 is a perspective end view of a laminated foamed thermoplastic resin sheet prepared by another embodiment of this invention.

An efficient method for laminating paper or textile materials to a foamed thermoplastic resin form has been discovered. In this method, a rigid foamed thermoplastic resin form and a covering material of paper or textile material are assembled, placed under a light pressure insufficient to crush the foamed thermoplastic resin form and the covering material is heated above the melting point of the foamed thermoplastic resin. This method provides strong adherent bonds in which the covering material itself will tear before the bond between the covering material and the foamed thermoplastic resin is broken.

The following examples and descriptions are set forth to illustrate more clearly the principle and practice of this invention to those skilled in the art.

*Example I*

Sheets of kraft paper are placed on both faces of a block of polystyrene foam measuring 1½" x 8" x 8". The sandwich structure is inserted in a platen press heated to 340° F. and a light pressure is applied thereto. The sandwich structure is left in the press for less than 1 minute and excellent adhesion is obtained with the paper stock tearing before rupture of the paper-foamed polystyrene bond.

FIG. 1 illustrates an apparatus designed for continuously laminating sheets of covering material, e.g. paper, to both sides of a sheet of foamed thermoplastic resin. A sheet of foamed thermoplastic resin 22 (prepared by sheet-forming means not shown) is driven through pressure-applying nip rolls 34—34 and 39—39 by driving rolls 30—30. Sheets of covering material 36—36 are drawn over rolls 34—34 and 39—39 and are forced into pressured engagement with the surfaces of sheet 22. Before making pressured contact with the foamed thermoplastic resin sheet 22, the sheets of covering material are heated above the melting point of the foamed thermoplastic resin by passing through pairs of heated platens 38—38. Rolls 34—34 and 39—39 are heated to maintain the temperature of the covering sheets 36—36 above the melting point of the foamed thermoplastic resin sheet.

FIG. 2 illustrates a modification of the apparatus of FIG. 1 which differs therefrom only in that sheets of covering material 36—36 are heated above the melting point of the foamed thermoplastic resin by passing the assembly of foamed thermoplastic resin sheet and covering material through a heated pair of light pressure-applying platens 40—40.

While FIGS. 1 and 2 illustrate the preparation of laminated structures in which two sheets of covering material are laminated to both surfaces of a foamed thermoplastic resin sheet, it is apparent that similar structures can be prepared in which a single sheet of covering material is laminated to only one surface of a foamed thermoplastic resin sheet.

Essentially any foamed thermoplastic resin form may be employed in the practice of this invention. Examples of the resins from which such foamed thermoplastic resin forms may be derived include: cellulose ethers and esters, e.g., ethyl cellulose, cellulose acetate, cellulose nitrate; homopolymers and interpolymers of monomers containing the vinylidene group $CH_2=C<$ such as vinyl halides, e.g., vinyl chloride, vinyl bromide; vinylidene chloride; vinyl esters of carboxylic acids, e.g., vinyl acetate, vinyl propionate, vinyl benzoate; olefins, e.g., ethylene, isobutylene; vinyl ethers, e.g., vinyl methyl ether, vinyl ethyl ether, vinyl isobutyl ether; unsaturated carboxylic acids and derivatives thereof, e.g., acrylic acid, methacrylic acid, methyl acrylate, ethyl carylate, methyl methacrylate, acrylamide, acrylonitrile, methacrylonitrile; and interpolymers of the above type, vinylidene monomers and unsaturated alpha,beta-polycarboxylic acids and derivatives thereof, e.g., maleic anhydride, dimethyl maleate, dibutyl fumarate, diallyl maleate, etc. In general, optimum results are obtained with rigid, relatively non-elastic thermoplastic resins such as homopolymers and interpolymers of vinyl chloride, homopolymers of vinyl aromatic compounds, e.g., styrene, o-chlorostyrene, p-chlorostyrene, 2,5-dichlorostyrene, 2,4-dichlorostyrene, p-methylstyrene, p-ethylstyrene, vinyl naphthalene, alpha-methylstyrene and interpolymers of such vinyl aromatic compounds containing at least 70% of the vinyl aromatic compound. It is feasible and sometimes desirable to employ a blend of two or more thermoplastic resins such as, e.g. a blend of styrene and a rubbery diene polymer such as natural rubber, butadiene-styrene rubbers, butadiene-acrylonitrile rubbers and the like. High impact polystyrene prepared by polymerizing monomeric styrene in the presence of a rubbery diene polymer also may be employed advantageously.

The covering materials employed are paper and textile materials. Any of the common textiles may be employed, e.g., woven sheets of cotton, rayon, wool, silk, cellulose acetate, jute, nylon and the newer synthetic fibers based upon acrylonitrile polymers or linear condensation polymers derived from terephthalic acid and ethylene glycol.

Laminated structures having a covering material other than paper or a textile material can be prepared by a slight modification of the basic process of this invention. In this modification, paper or a textile material is cemented to the desired external covering material, e.g., metal foil, plastic sheets, etc., by any conventional means. This two-ply covering material is then laminated to a foamed thermoplastic resin form by the means previously described. Such a construction is illustrated in FIG. 3 wherein 42 is a sheet of foamed thermoplastic resin and 46—46 are sheets of external covering material, e.g., metal foil, which are cemented to paper sheets 45—45.

The above descriptions and particularly the examples are set forth by way of illustration only. It will be obvious to those skilled in the art that many variations and modifications thereof can be made without departing from the spirit and scope of the invention herein described.

What is claimed is:

1. A method for laminating a fibrous sheet of covering material to a rigid foamed thermoplastic resin sheet which consists essentially of (1) assembling a fibrous sheet of covering material in engagement with at least one surface of a rigid foamed thermoplastic resin sheet, (2) applying a light pressure to the assembly, said pressure being insufficient to crush said resin sheet, (3) heating said fibrous sheet until the surface thereof contiguous to the resin sheet is above the melting point of the resin sheet, (4) maintaining said assembly under said heat and pressure conditions for less than one minute, but for a period sufficient to bond the fibrous sheet to the resin sheet, (5) relieving the pressure on the assembly, and (6) cooling the assembly.

2. The method of claim 1 in which the fibrous sheet of covering material is paper.

3. A continuous method for laminating a fibrous sheet of covering material to a rigid foamed thermoplastic resin sheet which consists essentially of (1) heating a continuous fibrous sheet of covering material to above the melting point of a foamed thermoplastic resin, (2) assembling said heated continuous fibrous sheet of covering material in engagement with at least one surface of a continuous rigid foamed thermoplastic resin sheet, (3) advancing said assembly through a pressure zone in which a light pressure insufficient to crush the resin sheet is applied to the assembly while maintaining the fibrous sheet above the melting point of the resin sheet for less than one minute but for a period sufficient to bond the fibrous sheet to the resin sheet, and (4) immediately thereafter cooling said assembly.

4. The method of claim 3 in which the fibrous sheet of covering material is paper.

References Cited in the file of this patent

UNITED STATES PATENTS

| 1,874,674 | Watson | Aug. 30, 1932 |
| 1,953,111 | Horne | Apr. 3, 1934 |
| 2,521,470 | Matheson | Sept. 5, 1950 |
| 2,552,641 | Morrison | May 15, 1951 |
| 2,770,406 | Lane | Nov. 13, 1956 |

FOREIGN PATENTS

| 842,267 | Germany | Sept. 15, 1952 |